Sept. 1, 1959 M. W. JOHNSON 2,901,878
LAWN TRIMMER
Filed May 21, 1956

INVENTOR.
Melvin W. Johnson
BY
Rodney Bedell
ATTORNEY

United States Patent Office 2,901,878
Patented Sept. 1, 1959

2,901,878

LAWN TRIMMER

Melvin W. Johnson, House Springs, Mo., assignor, by mesne assignments, to Gardex, Inc., Michigan City, Ind., a corporation of Indiana Application May 21, 1956, Serial No. 586,020

2 Claims. (Cl. 56—256)

The invention relates to manually operated tools for trimming the edge of a lawn adjacent to walks, foundations, flower beds, trees and shrubbery, etc., and consists in a novel traction member and associated shearing blades forming a unit which is better adapted for the purposes of such a trimmer than trimmers previously in use.

The main object of the invention is to increase the traction effect of a tool of the class described, irrespective of whether the axis of the rotating shears and traction roller is horizontal or inclined.

Another object is to avoid uneven wear of the traction member tread because of extended use with the axis of its traction member and shears inclined to the ground surface.

Another object is to facilitate the tilting of the shearing blades from their normal vertical position.

In the accompanying drawings illustrating a selected embodiment of the invention and showing different working conditions:

Figure 1:
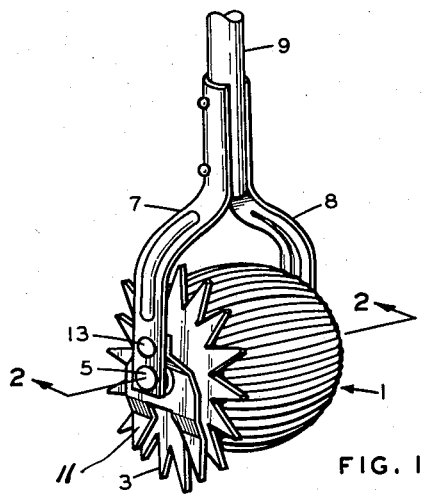
Figure 1 is a perspective of the tool looking toward the shear end.

The tool comprises essentially a roller 1, to one end of which is fixed a star wheel shear blade 3. The roller and blade unit are rotatable upon an axle 5 which is journaled in mounting brackets 7 and 8. The brackets are bolted to a handle 9. A stationary shear blade 11 is loosely attached to bracket 7 by a rivet 13. A coil spring 15 surrounds axle 5 and is compressed between bracket 7 and the opposing face of stationary shear 11 to thrust the latter against rotating shear 3.

Figure 2:
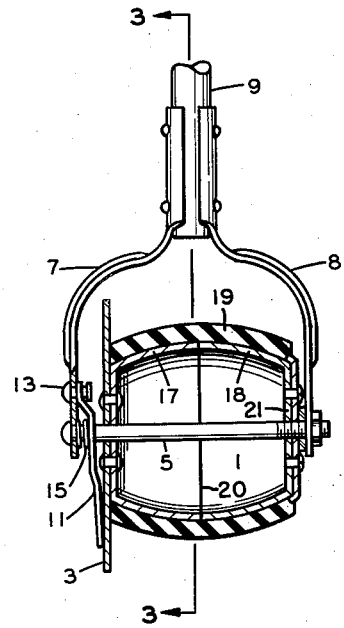
Figure 2 is a vertical longitudinal section taken on line 2—2 of Figure 1.
Figure 3:
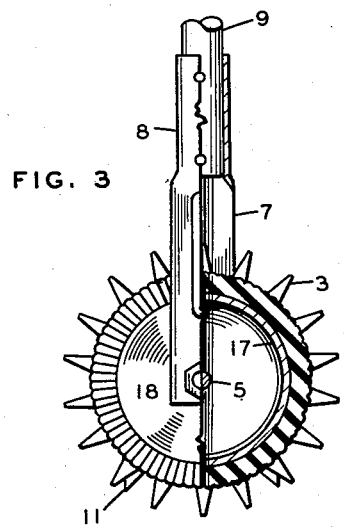
Figure 3 is in part an end elevation looking at the end opposite to that shown in Figure 1, and in part a vertical transverse section on line 3—3 of Figure 2.
Figure 4:
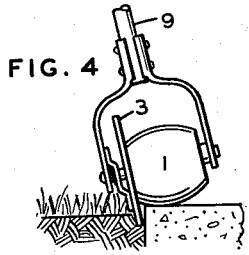
Figure 4 shows the tool in use with the traction roller on a concrete walk above the level of the turf and the shear blades inclined downwardly towards the walk.
Figure 5:
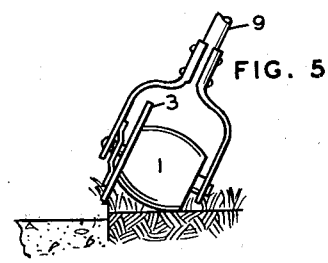
Figure 5 shows the tool inclined in the opposite direction from the vertical and rolling over turf at a higher level than the walk.

The roller is formed of a pair of cup-like pressings 17, 18, the open ends of which abut each other at 20, as shown in Fig. 2. Before being assembled, shear 3 is riveted to the base of cup 17. The cups are then assembled as shown and a rubber cylinder 19 having an initial diameter corresponding to that of the closed ends 21 of the cups is stretched over the assembled cups and securely holds the cups assembled and in alignment with each other.

Figure 6:
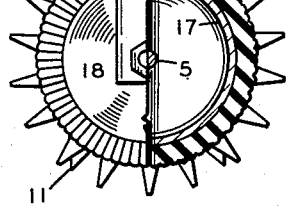
Figure 6 shows the tool in use alongside a foundation.
Figure 7:
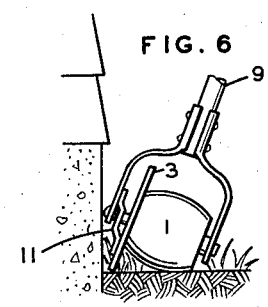
Figure 7 shows the tool with the roller axis horizontal and the shear upright and being used adjacent to a flower bed.
Figure 8:
Figure 8 shows the tool with its roller axis inclined and the shear inclined to cut weeds growing to a greater height than the diameter of the roller.

The exterior face of sleeve 19 is provided with corrugations extending from end to end of the sleeve to provide increased wearing surface and traction. Axle 5 is formed by a bolt having a head seated against bracket 7 and a nut seated against bracket 8. Axle bolt 5 and spring 15 hold cups 17, 18 against axial separation. The barrel-like contour of the roller with the longitudinal corrugations provides adequate and uniform traction irrespective of whether the axle is parallel to the surface over which the roller is moving or is inclined to the supporting surface as shown in Figures 6 and 8. When the roller is inclined, the surface in contact with the ground is of such area that it will wear down slowly and the cutter is not unduly elevated from the ground because it is tilted from the vertical.

The metal parts are readily formed from stampings and readily assembled with a minimum of bolts or other fastening elements. In using a tool of the type illustrated, the end of the roller bends the grass over to a position where it is best engaged by the shear. The barrel shape of the roller leaves the grass inclined at an angle, even though it is positioned inwardly of the blade, and thus facilitates its engagement by the shear. By increasing the tilt of the roller, the grass may be cut at different heights. The axle is enclosed throughout the length of the roller, which avoids entanglement.

The details of the structure may be varied without departing from the spirit of the invention as embodied in a barrel shaped traction roller, and the exclusive use of those modifications coming within the scope of the claims is contemplated.

What is claimed is:

1. A lawn trimming tool comprising a handle, a pair of spaced forks carried by one end of said handle, a barrel-like traction roller journaled by and between said forks, a star wheel shear blade secured concentrically to one end of said roller and having teeth projecting outwardly beyond the roller periphery, at least the central portion of said roller and the end portion thereof remote from said blade being substantially uniformly curved longitudinally thereof, whereby longitudinal tangents to the end portion of said roller remote from said blade extend with clearance outwardly of the tips of said blade teeth, a second shear blade between said wheel blade and the adjacent fork and comprising a portion loosely secured to the adjacent fork and another portion opposing the teeth of the wheel blade, and a spring between the fork and the last named blade pressing the latter against the wheel blade.

2. A lawn trimming tool according to claim 1 in which the barrel-like traction roller consists of a pair of open end cups, each flaring from its closed end toward its open end with the rims of their open ends abutting each other at the middle of the roller, the closed ends of the cups being apertured to receive the roller axle, there being a normally cylindrical sleeve of elastic material surrounding and stretched over the sides of the cups and holding them in alignment.

References Cited in the file of this patent

UNITED STATES PATENTS

| 1,529,797 | Gray et al. | Mar. 17, 1925 |
| 2,433,659 | Gibson | Dec. 30, 1947 |
| 2,660,854 | Chadwick | Dec. 1, 1953 |
| 2,686,364 | Arnoldy | Aug. 17, 1954 |
| 2,708,335 | Newton | May 17, 1955 |